United States Patent [19]

Brock et al.

[11] Patent Number: 5,035,534
[45] Date of Patent: Jul. 30, 1991

[54] APPARATUS FOR TRANSFERRING AN ASPHALT-AGGREGATE MIXTURE

[75] Inventors: James D. Brock, Chattanooga, Tenn.; Donald W. Smith, Aurora, Ill.

[73] Assignee: Barber-Greene Company, DeKalb, Ill.

[21] Appl. No.: 405,426

[22] Filed: Sep. 11, 1989

Related U.S. Application Data

[63] Continuation-in-part of Ser. No. 309,079, Feb. 10, 1989, which is a continuation-in-part of Ser. No. 89,318, Aug. 25, 1987, Pat. No. 4,818,139.

[51] Int. Cl.⁵ ............................................. E01C 19/00
[52] U.S. Cl. ....................................... 404/81; 404/110; 404/92; 404/115; 242/64; 242/135; 242/202
[58] Field of Search ............... 404/83, 101, 108, 109, 404/113, 110, 81, 92, 115; 222/216, 217; 241/200, 202, 35, 63, 64, 82, 82.1, 82.4, 134, 135

[56] References Cited

U.S. PATENT DOCUMENTS

| | | | |
|---|---|---|---|
| 2,041,350 | 5/1936 | Johnson | 404/101 |
| 2,669,915 | 2/1954 | McConnaughay | 404/108 |
| 2,951,426 | 9/1960 | Pollitz | 404/108 |
| 3,225,668 | 8/1962 | Maginniss | 404/101 |
| 3,699,855 | 10/1972 | Leister | 404/108 |
| 3,907,451 | 9/1975 | Fisher et al. | 404/101 |
| 3,967,912 | 7/1976 | Parker | 404/108 |
| 4,115,023 | 9/1978 | Wada et al. | 404/98 |
| 4,145,154 | 3/1979 | Mingot | 404/81 |
| 4,226,552 | 10/1980 | Moench | 404/91 |
| 4,272,212 | 6/1981 | Bauer et al. | 404/72 |
| 4,304,504 | 12/1981 | Trujillo | 404/108 |
| 4,311,408 | 1/1982 | Wren | 404/104 |
| 4,317,642 | 3/1982 | Wirtgen | 404/72 |
| 4,332,505 | 6/1982 | Mauldin | 404/108 |
| 4,379,653 | 4/1983 | Brown | 404/95 |
| 4,534,674 | 8/1985 | Cutler | 404/75 |
| 4,636,110 | 1/1987 | Augoyard | 404/100 |
| 4,682,909 | 7/1987 | Mihara | 404/90 |
| 4,688,965 | 8/1987 | Smith et al. | 404/75 |
| 4,704,046 | 11/1987 | Yant | 404/109 |
| 4,772,156 | 9/1988 | Craig | 404/104 |
| 4,818,139 | 4/1989 | Brock et al. | 404/109 |

FOREIGN PATENT DOCUMENTS

| | | | |
|---|---|---|---|
| 2453748 | 5/1976 | Fed. Rep. of Germany | 404/108 |
| 2645344 | 4/1977 | Fed. Rep. of Germany | 404/101 |
| 2628325 | 1/1978 | Fed. Rep. of Germany | 404/101 |
| 2536772 | 6/1984 | France | 404/108 |
| 304327 | 5/1971 | U.S.S.R. | 404/109 |

Primary Examiner—Ramon S. Britts
Assistant Examiner—Roger J. Schoeppel
Attorney, Agent, or Firm—Jones, Day, Reavis & Pogue

[57] ABSTRACT

An apparatus provided with a hopper having a capacity substantially equal to the capacity of a supply truck for receiving asphalt-aggregate material. A transversely disposed screw auger is provided for remixing the asphalt-aggregate material in the hopper prior to its discharge. In one form of the invention, the apparatus forms part of a self-propelled storage vehicle which transfers the material from the supply truck to a conventional finishing machine.

3 Claims, 4 Drawing Sheets

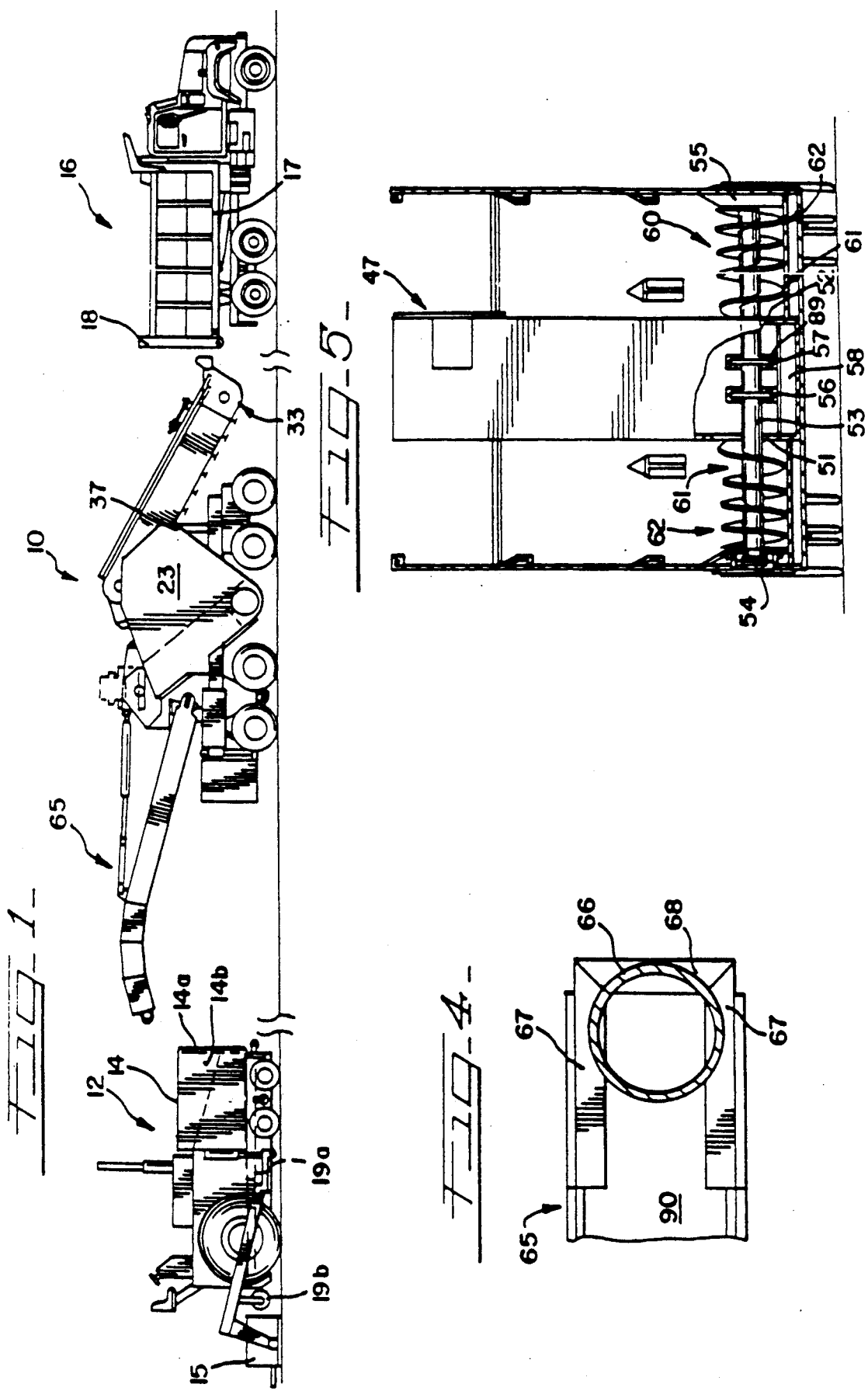

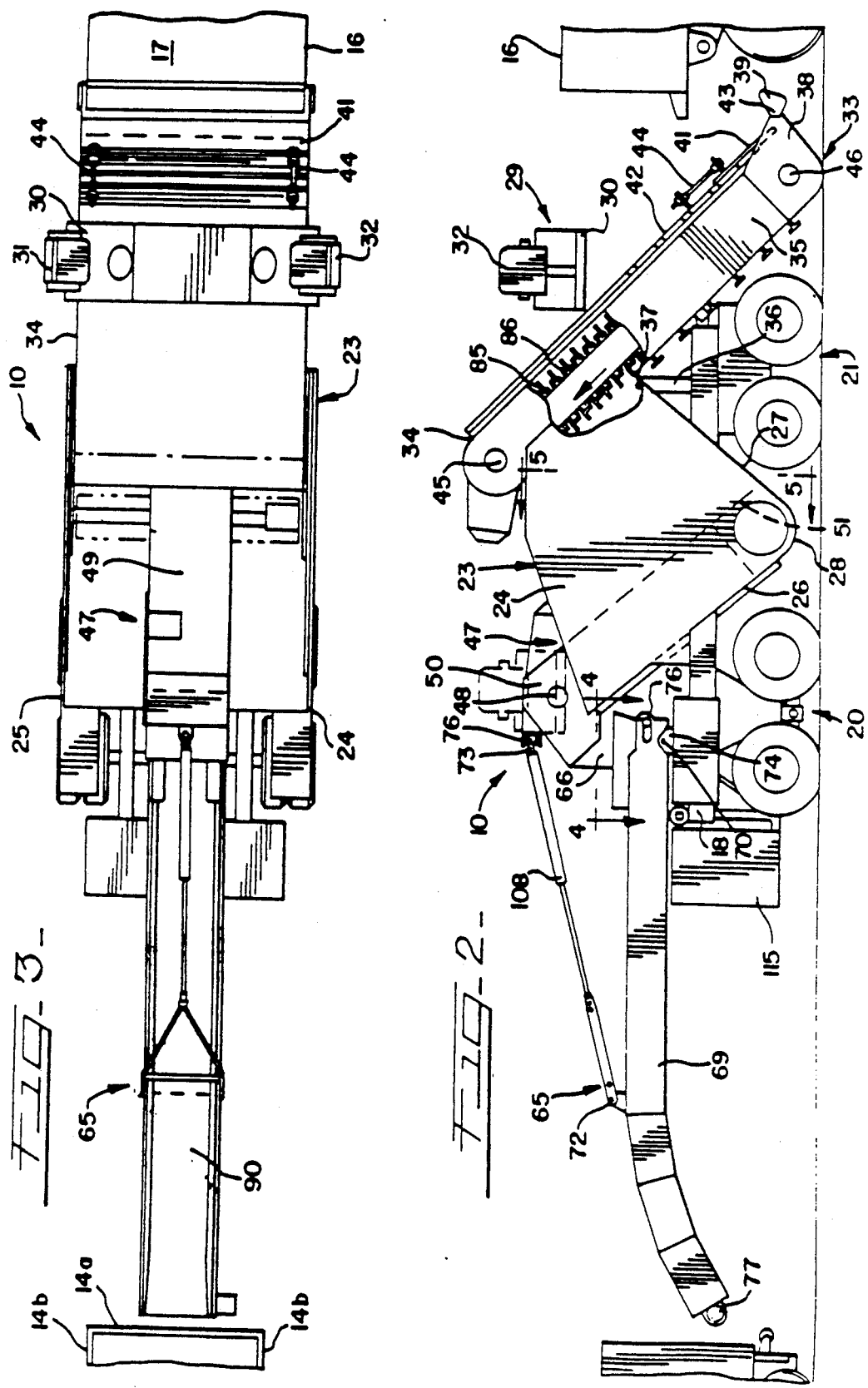

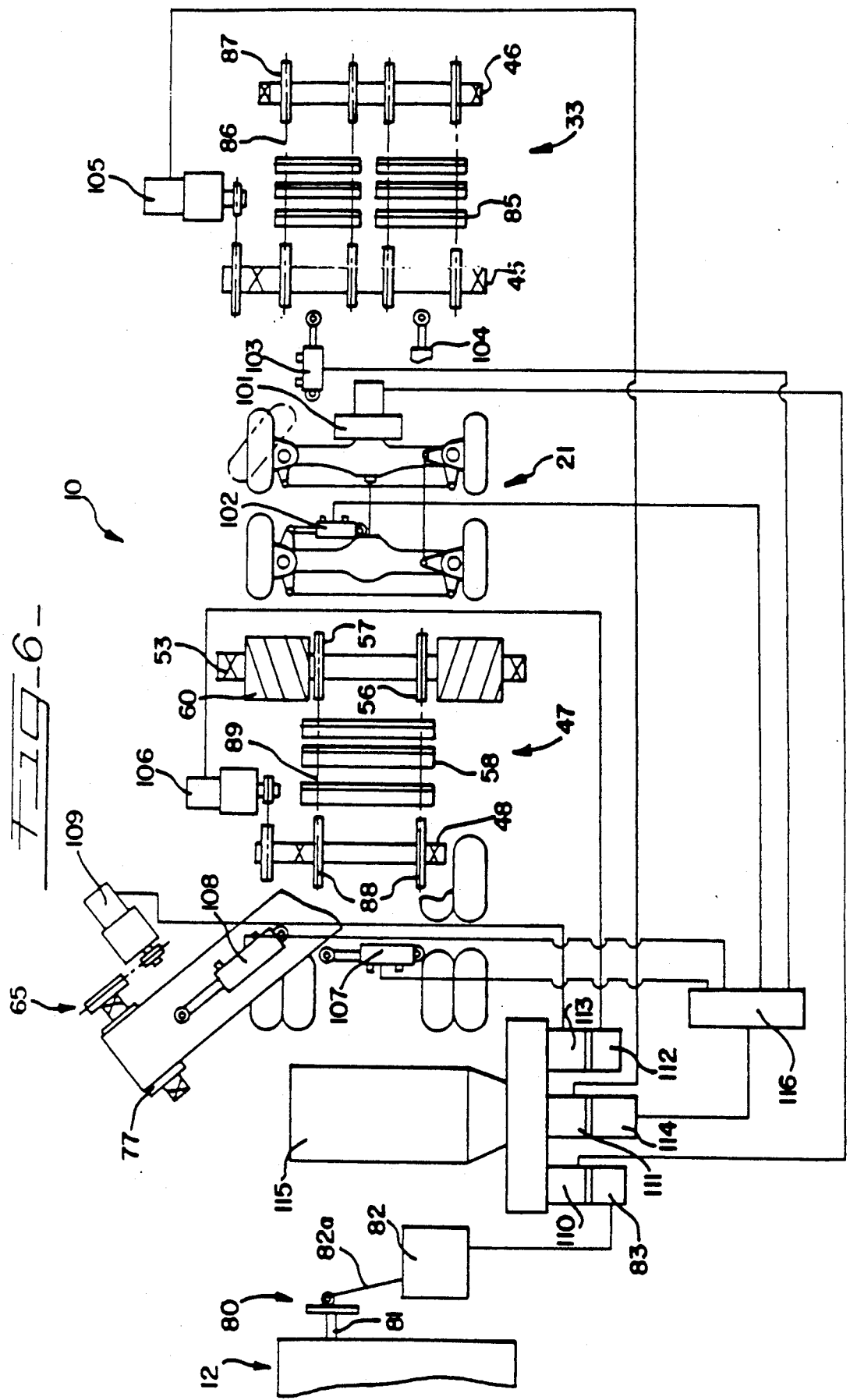

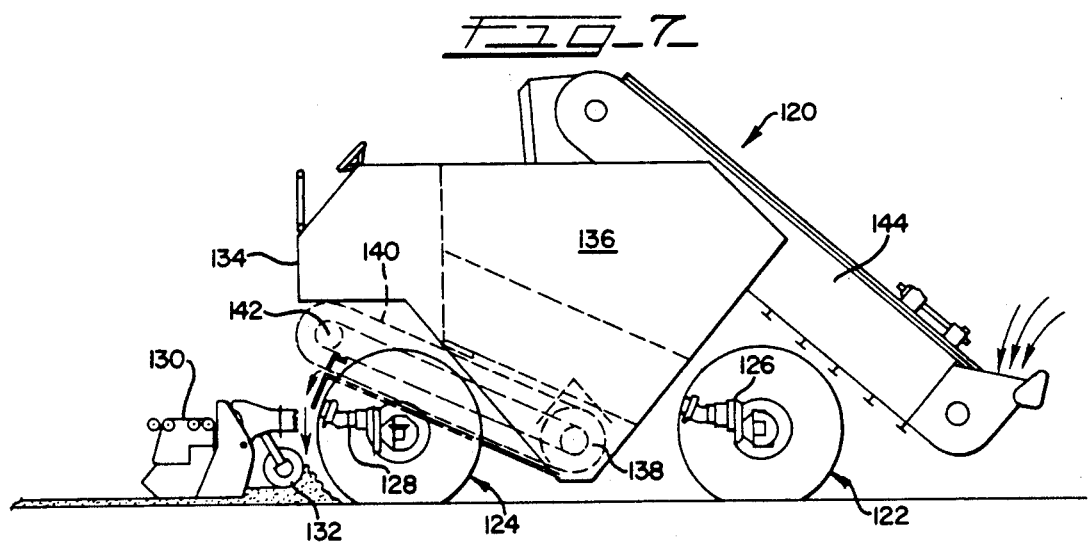
FIG_7
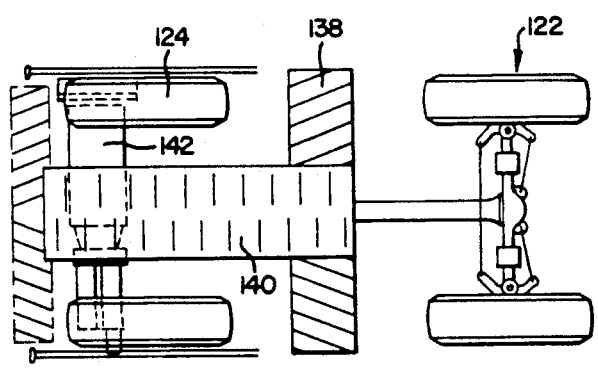
FIG_8

APPARATUS FOR TRANSFERRING AN ASPHALT-AGGREGATE MIXTURE

BACKGROUND OF THE INVENTION

This application is a continuation-in-part of patent application Ser. No. 309,079, filed Feb. 10, 1989, which in turn is a continuation-in-part of patent application Ser. No. 89,318, filed Aug. 25, 1987, now U.S. Pat. No. 4,818,139, issued Apr. 4, 1989.

FIELD OF THE INVENTION

The present invention relates in general to an apparatus for making an asphalt-aggregate pavement. In particular, the invention relates to an apparatus having improved capabilities for storing and remixing the asphalt-aggregate material.

SUMMARY OF THE PRIOR ART

As is known to those skilled in the art, when the asphalt-aggregate material is discharged from the surge bin at the asphalt plant into the bed of a delivery truck, the coarser material tends to flow toward the sides of the bed of the delivery truck. Thus, this coarser material will be transported to the sides or lateral extremities of the hopper of a finishing machine since the material is transported from the bed of the delivery truck to the hopper without any significant degree of transverse or lateral movement. The longitudinally extending slat conveyors and transversely disposed screw augers which serve to transport the material from the hopper to the screed do not serve to remix the material. Thus, the resulting asphalt pavement mat is not entirely homogenous as concerns aggregate particle size. Needless to say, this is not a desirable pavement characteristic as it tends to produce an uneven pavement surface. Consequently, it is desirable, prior to delivering the material to the screed, to remix the material in a hopper by imparting the requisite lateral or transverse movement of the material from the side portions to the central portion of the hopper to insure a homogenous mixture.

SUMMARY AND OBJECTS OF THE INVENTION

The present invention resides in providing a large capacity hopper capable of receiving the entire contents of the delivery dump truck. The large capacity hopper includes screw auger means for remixing the asphalt material to obtain a homogenous asphalt-aggregate mixture. In one embodiment of the invention, the aforesaid hopper and screw auger are part of a self-propelled vehicle which may shuttle back and forth between the delivery trucks and the finishing machine. In a second embodiment of the invention, the large capacity hopper and screw auger form part of the finishing machine itself.

Thus, a primary object of the present invention is to provide a large capacity hopper remixing means for receiving asphalt-aggregate material from the delivery trucks.

Another object of the present invention is to provide such a hopper with a transversely disposed screw auger for remixing the asphalt-aggregate material in the hopper.

These and other objects and advantages of the present invention will become apparent from the following description.

DESCRIPTION OF THE DRAWINGS

FIG. 1 is a schematic side elevation showing one embodiment of the present invention incorporated in a self-propelled storage vehicle which operates in association with a conventional finishing machine and a delivery truck;

FIG. 2 is an enlarged side elevation of the self-propelled storage vehicle;

FIG. 3 is a top plan view of the self-propelled storage vehicle;

FIG. 4 is a section taken along the line 4—4 of FIG. 2;

FIG. 5 is a section view taken along line 5—5 of FIG. 2 with a portion of the discharge conveyor housing cut-away to show a portion of the discharge conveyor;

FIG. 6 is a diagrammatic view showing the hydrostatic drive system for the self-propelled storage vehicle and the associated hydraulic systems for the various conveyors;

FIG. 7 is enlarged side elevation of a modified finishing machine equipped with the large capacity hopper and screw auger of the present invention; and FIG. 8 is a top plan view of the modified finishing machine.

DESCRIPTION OF THE INVENTION

Referring to FIG. 1, one embodiment of the present invention is incorporated in a self-propelled storage vehicle, generally designated 10, which is disclosed and claimed in U.S. Pat. No. 4,818,139, identified above. The self-propelled vehicle is shown in association with a conventional finishing machine, generally designated 12, and a delivery truck, generally designated 16.

The delivery truck 16 is normally in the form of a dumptruck having a pivotably mounted bed 17 with a tailgate 18. The truck 16 transfers the aggregate-asphalt material from a remote source to the storage vehicle 10 as will be explained below.

The finishing machine may be supported either by endless tracks or by rubber tires and includes a hopper 14 and a vibratory screed 15 which is of the floating type well known to those skilled in the art. The finishing machine also includes a conventional conveyor system consisting of longitudinally disposed conveyors 19a (shown in broken lines) and transversely disposed screw augers 19b for delivering the asphalt-aggregate material from the hopper 14 to a position just in advance of the screed 15 where it is discharged onto the subgrade.

Referring more particularly to FIGS. 2, 3, and 6, the self-propelled storage vehicle 10 includes a chassis 18 that is supported on the roadway surface by first and second wheel sets 20 and 21, respectively. It will be understood that alternative roadway engaging means, such as endless tracks, could be used in place of the wheel sets 20 and 21.

As shown in FIG. 6, the hydrostatic drive system for the self-propelled storage vehicle 10 consists of individual hydraulic motors 101-109 that are supplied with fluid pressure from the hydraulic pumps 110-114. (It should be noted that the intake and exhaust lines for the hydraulic motors are represented by a single line in the drawings for improved clarity.) An engine 115 provides the motive force for the pumps as is conventional in hydraulic drive systems.

Wheel set 21 is driven by hydraulic propel motor 101 that is supplied with fluid pressure by propel pump 110.

The wheel set 21 is also steerable by steer cylinder 102 which is supplied with fluid pressure from auxiliary pump 114 through manifold 116.

Referring more particularly to FIGS. 2 and 3, a large capacity storage hopper 23 is mounted on the chassis 18. The hopper 23 has a capacity approximately equal to the capacity of a single supply truck 16. The hopper, open at its top, consists of sidewalls 24, 25 and a bottom including a first inclined wall 26 joined with a second inclined wall 27 by an arcurate wall portion 28.

The self-propelled storage vehicle further includes an operator's platform 29 having a horizontally disposed frame 30 supporting identical operator control stations 31 and 32. The platform 29 is preferably mounted on the chassis 18 by means of a parallel linkage system (not shown) permitting the platform 29 to be swung back and forth over the hopper 23 (between the solid and broken line positions shown in FIG. 2) to facilitate operating the self-propelled vehicle in both directions. Of course, each operator control station includes the various controls for operating the hydraulic drive system of FIG. 6.

The storage vehicle 10 also includes a high capacity loading conveyor 33, preferably of the drag-slat type, comprising a frame 34 having side members 35 pivotably mounted to the uprights 36 of the chassis 18 by a horizontal shaft 37. Thus, conveyor 33 can be swung vertically about the horizontal shaft 37 between the loading position shown in FIG. 2 and the transport position shown in FIG. 1. The swinging movement of conveyor 33 is provided by a pair of hydraulic cylinders 103 and 104 supplied with fluid pressure by auxiliary pump 114 through manifold 116, as shown in FIG. 6.

The drag-slat conveyor 33 has slats 85 (FIGS. 2 and 6) mounted on endless chains 86 meshing with sprocket wheels 87 fixed to shafts 45 and 46. Shaft 45 is driven by hydraulic motor 105, as shown in FIG. 6, and is supplied with fluid pressure from a separate loading conveyor pump 111. The infeed end of conveyor 33 includes a trough 38 with a bumper 39 adapted to abut the back end of the supply truck 16 during the truck unloading operation. The trough 38 has a width substantially the same as the width of the supply truck bed 17 such that the asphalt-aggregate material can quickly and easily be dumped from the truck 16 into the trough 38.

An adjustable gate 41 is movably mounted over the infeed opening of the conveyor that is defined by the conveyor frame cover plate 42 and the lip 43 of the trough. The gate 41 is secured to the cover plate 42 by a pair of adjustable screwthread assemblies 44 such that the size of the infeed opening can be varied to regulate the flow of material into the conveyor 33.

The bottom wall of conveyor 33 terminates at a position just inside of the bottom wall 27 of the hopper such that the aggregate-asphalt material will fall into the hopper as the slats of the conveyor push the material past this position, as shown in the cut-away section of FIG. 2. Mounted on the inside surface of the hopper bottom wall 26 is a first discharge conveyor 47, as shown in FIGS. 2, 3, 5 and 6, which is preferably of the drag-slat type. The discharge conveyor 47 includes a first set of sprocket wheels 88 fixed to shaft 48. Hydraulic motor 106 drives shaft 48 and is provided with fluid pressure by a separate discharge pump 112.

A housing, consisting of a top wall 49 and a pair of opposed sidewalls 50, completely encloses the conveyor 47 except for openings 51 and 52 (FIG. 5) located in the sidewalls 50 in the area of arcuate wall portion 28.

The second shaft 53 (FIG. 6) of the conveyor 47 extends through openings 51 and 52 and is journaled in suitable bearing assemblies 54 and 55, as shown in FIG. 5. Sprocket wheels 56 and 57 are fixed to shaft 53 and mesh with chains 89 that, in turn, support the slats 58.

The second shaft 53 of the conveyor 47 also functions as the shaft for the screw auger 60 that is disposed in the area of the hopper 23 defined by the arcuate wall portion 28 as shown in FIGS. 2, 3, and 5. Because the sprocket wheels 56 and 57 are fixed to the shaft 53, the hydraulic motor 106 also serves to rotate the screw auger 60. The rotation of the screw auger 60, in turn, conveys the aggregate-asphalt material from the lateral sides of the hopper, through the openings 51 and 52 and into the path of the first discharge conveyor 47.

As mentioned above, by virtue of the nature of the discharge from the surge bin, the coarser aggregate material will tend to flow to the lateral extremities of the bed of the delivery truck. Since the conveyor 33 transports the material only longitudinally, the material will be transferred into the storage hopper 23 with the coarser materials at the lateral extremities of that hopper. As will be clear from the description to follow, the screw auger 60 not only transports the material to conveyor 47 but also remixes the material such that a more uniform mixture of material is delivered to the finishing machine 12.

This mixing action of the screw auger 60 is especially important to counteract the tendency, mentioned above, of the aggregate-asphalt material to separate according to particle size during transportation and handling. To this end, the screw auger 60 is designed such that each end of the shaft 53 is provided with first flight sections 61 joining with second flight sections 62. The pitch of the first flight sections 61 is greater than the pitch of the second flight sections 62. Thus, the volumes bounded by the flights of the first flight section 61 are greater than the volumes bounded by the flights of the second flight sections 62. As a result, when the coarse material, located at the lateral edges of the hopper, is conveyed from the second flight section 62 to the first flight section 61, it will not completely fill the larger volumes, thereby allowing the finer material, located in the central portion of the hopper, to enter the void spaces in these larger volumes and combine with the coarser material. This mixture of coarse and fine material is then conveyed to discharge conveyor 47. Thus, the variance in pitch between the flight sections 61 and 62 enhances the mixing capabilities of the screw auger 60.

A second discharge conveyor 65 is mounted on the chassis 18 such that the infeed end of conveyor 65 is located beneath the outfeed end of the first discharge conveyor 47. Material discharged from the first discharge conveyor 47 at the top edge of bottom wall 26 falls through the chute 66 onto the second discharge conveyor 65 as shown in FIGS. 2, 3, and 4. The infeed end of the frame 69 of the second discharge conveyor 65 is formed with guides 67 and 68 facilitating the flow of material from the chute 66 onto the conveyor 65. Preferably, the second discharge conveyor 65 is of the belt-type having end rollers 76, 77, and an endless belt 90. Roller 77 is driven by hydraulic motor 109 supplied with fluid pressure from pump 113 as shown in FIG. 6. It should be noted that a drag slat conveyor of the type already described may also be used.

The frame 69 is mounted for vertical swinging movement about shaft 70 and is raised and lowered by the lift cylinder 108 extending between a first pivot point 72 located on the conveyor frame 69 and a second pivot point 73 located on a rotatable sleeve 76 supported by the chassis 18. The trunnion 74 supports shaft 70 and is mounted on a turntable supported by a suitable bearing assembly (not shown) and rotated by hydraulic cylinder 107, as shown in FIGS. 2 and 6, such that the discharge end of conveyor 65 may be swung beyond the lateral extremities of the storage vehicle 10. Both the vertical lift cylinder 108 and the horizontal swing cylinder 107 are provided with fluid pressure from the auxiliary pump 114 through the manifold 116.

Referring to FIG. 7, an alternative embodiment of the present invention is incorporated in a modified finishing machine, generally designated 120. The parts of this finishing machine which are conventional will now be briefly described.

The finishing machine 120 includes a suitable chassis or frame (not shown) supported by a front pair of drive wheels 122 and a rear pair of drive wheels 124. Preferably, both the front and rear sets of drive wheels are driven by suitable hydrostatic drive units 126 and 128, respectively. As shown in FIG. 8, the front set of drive wheels 122 is steerable in nature.

The finishing machine 120 includes the usual vibratory screed 130 which is mounted to the chassis by a pair of draft arms pivotally mounted to the chassis in a manner well known to those skilled in the art. The finishing machine also includes a transversely disposed screw auger 132 located just forwardly of the screed. The transverse screw auger moves the material transversely of the finishing machine from the central portion thereof to the lateral extremities of the screed, again, in a manner well known to those skilled in the art.

The chassis of the finishing machine supports an operator's platform 134. This platform will be provided with the various controls necessary to permit the operator to control the various elements of the hydrostatic drive system.

Turning now to the present invention as it is incorporated in the modified finishing machine 120, the chassis supports a large capacity hopper 136. This hopper is substantially the same as the hopper 23 described above in connection with the first embodiment of the present invention. In this regard, the capacity of the hopper is substantially the same as the capacity of a delivery dump truck of the type shown in FIG. 1. The hopper 136 is provided at its lower most portion with a transversely disposed screw auger 138. Again, the screw auger 138 will be substantially the same as the screw auger 60 described in the embodiment of FIGS. 1 through 6.

The modified finishing machine is provided with a discharge conveyor 140. This discharge conveyor is substantially the same as the discharge conveyor 47 which forms part of the first embodiment of the present invention described above. The discharge conveyor 140, which is provided with a suitable hydrostatic drive 142, has a discharge end disposed over the transverse screw auger 132.

Material in the bottom of the hopper 136 will be transferred from the lateral extremities of the hopper to the center of the hopper by the auger 138. The material will then be transferred rearwardly and upwardly by the conveyor 140. The material will then fall by gravity over the central portion of the auger 132 and will then be distributed laterally in front of the screed 130 for compaction into a pavement mat.

The height of the hopper 136 is such that it cannot be loaded by conventional delivery trucks, such as the truck 16 illustrated in FIG. 1. The hopper 136 of the modified finishing machine 120 may be supplied with material utilizing the self-propelled storage vehicle 10 described above in connection with the embodiments of FIGS. 1 through 6. In that event, to the extent the material tends to become segregated as it drops into the hopper 136 from the second discharge conveyor 65, the transfer screw auger 138 will serve to remix the material such that a homogenous asphalt mat will be produced using the modified paver 120.

As an alternate to loading the hopper 136 from the self-propelled transfer vehicle 10, the modified finishing machine 120 may be provided with a high capacity loading conveyor 144 which will be substantially the same in construction and operation as the high capacity loading conveyor 33 described in connection with the embodiments of FIGS. 1 through 6. In that event, the coarser material will be deposited adjacent the lateral extremities of the hopper 136, as described above with respect to hopper 23 of the embodiment of FIGS. 1 through 6. Of course, the transversely disposed screw auger 138 will serve to remix the material in the same manner as the auger 60 described above.

Although the invention has been described in its preferred forms with a certain degree of particularity, it is to be understood that the present disclosure has been made by way of example only. Numerous changes in the details and construction of the combination and arrangement of parts will be apparent without departing from the spirit and scope of the invention, as defined in the appended claims.

What is claimed is:

1. An apparatus for receiving an asphalt-aggregate material comprising:
   (a) chassis means including ground engaging mobile support means and steering means for at least a part of the support means;
   (b) motive power means carried by said chassis means and connected to at least a part of said support means;
   (c) hopper means mounted on said chassis means in substantial symmetrical relationship with the longitudinal centerline of the chassis means;
   (d) conveyor means mounted on said chassis means for transporting the asphalt-aggregate material longitudinally of said chassis means from said hopper toward the rear of said apparatus; and
   (e) transversely disposed screw auger means mounted in the lower portion of said hopper means for delivering the asphalt-aggregate material from the lateral extremities thereof to the central portion of said hopper means wherein said screw auger means has a first pair of screw sets at the outer ends of the auger means and at least a second pair of screw auger sets inwardly of the first pair of screw sets, the second pair of screw sets having a pitch greater than the pitch of the first pair of screw sets for allowing the asphalt-aggregate material at the center portion of the hopper means to combine with the material transported by the first set of screw sets from the transverse extremities of the hopper means.

2. The apparatus according to claim 1 wherein said hopper has side walls of substantial height thereby providing the hopper with a capacity substantially the same as the capacity of a delivery dump-truck.

3. The apparatus according to claim 1 further including a loading conveyor for transferring material from a delivery truck to said hopper.

* * * * *